US011025617B2

(12) United States Patent
Fang

(10) Patent No.: US 11,025,617 B2
(45) Date of Patent: *Jun. 1, 2021

(54) IDENTIFICATION OF A RELATED COMPUTING DEVICE FOR AUTOMATIC ACCOUNT LOGIN

(71) Applicant: Advanced New Technologies Co., Ltd., Grand Cayman (KY)

(72) Inventor: Tengfei Fang, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 16/945,764

(22) Filed: Jul. 31, 2020

(65) Prior Publication Data

US 2020/0366662 A1 Nov. 19, 2020

Related U.S. Application Data

(63) Continuation of application No. 15/857,730, filed on Dec. 29, 2017, now Pat. No. 10,742,640, which is a
(Continued)

(30) Foreign Application Priority Data

Jul. 2, 2015 (CN) .......................... 201510383179.8

(51) Int. Cl.
*H04L 29/06* (2006.01)
*G06F 21/31* (2013.01)
(Continued)

(52) U.S. Cl.
CPC ........ *H04L 63/083* (2013.01); *G06F 9/44526* (2013.01); *G06F 21/31* (2013.01);
(Continued)

(58) Field of Classification Search
CPC ... G06F 21/31; G06F 9/44526; H04L 63/083; H04L 63/0876; H04L 61/2503;
(Continued)

(56) References Cited

U.S. PATENT DOCUMENTS 7,748,047 B2 6/2010 O'Neill
8,006,309 B2 * 8/2011 Kikkoji .............. H04N 7/17318
726/27
(Continued)

FOREIGN PATENT DOCUMENTS

CN 100579023 1/2010
CN 101702647 5/2010
(Continued)

OTHER PUBLICATIONS

Construction and Application of Japanese Learner Corpus Bank in China, Shanghai Foreign Language Education Press, Jun. 2012, 4 pages (with machine translation).
(Continued)

*Primary Examiner* — Oleg Korsak
*Assistant Examiner* — Feliciano S Mejia
(74) *Attorney, Agent, or Firm* — Fish & Richardson P.C.

(57) ABSTRACT

In an implementation of identifying related computing devices for automatic user account login, a login request to a user account that includes a unique identification (ID) of a user computing device and an internet protocol (IP) address of the user computing device are received. One or more user computing devices that have logged in to the user account using a same IP address as the user computing device are identified based on a user ID of the user account and the unique ID of the user computing device. Whether one or more unique IDs corresponding to the one or more user computing devices that have logged in to the user account are correlated with the unique ID of the user
(Continued)

computing device is determined. If yes, data corresponding to login information used by the one or more user computing devices to log in to the user account to the user computing device for automatic account login are sent.

18 Claims, 3 Drawing Sheets

Related U.S. Application Data continuation of application No. PCT/CN2016/086869, filed on Jun. 23, 2016.

(51) Int. Cl.
*H04W 4/50* (2018.01)
*G06F 9/445* (2018.01)
*H04L 29/12* (2006.01)
*H04L 29/08* (2006.01)

(52) U.S. Cl.
CPC .......... *H04L 29/06* (2013.01); *H04L 61/2503* (2013.01); *H04L 63/0815* (2013.01); *H04L 63/0876* (2013.01); *H04W 4/50* (2018.02); *H04L 67/02* (2013.01)

(58) Field of Classification Search
CPC ..... H04L 63/0815; H04L 29/06; H04L 67/02; H04W 4/50
See application file for complete search history.

(56) References Cited

U.S. PATENT DOCUMENTS

| | | | |
|---|---|---|---|
| 8,452,961 B2* | 5/2013 | Song | H04L 63/08 713/170 |
| 8,739,278 B2* | 5/2014 | Varghese | H04L 63/1416 726/22 |
| 8,844,001 B2 | 9/2014 | Hao | |
| 8,955,081 B2* | 2/2015 | Metke | H04L 63/0815 726/8 |
| 9,207,897 B2* | 12/2015 | Takatsu | G06F 3/1267 |
| 9,338,156 B2* | 5/2016 | Oberheide | H04W 12/0608 |
| 9,386,120 B2* | 7/2016 | Borzycki | G06F 21/41 |
| 9,413,750 B2* | 8/2016 | Akula | H04L 67/02 |
| 9,515,958 B2* | 12/2016 | Satpathy | H04L 47/808 |
| 9,529,985 B2* | 12/2016 | Khalil | H04L 63/10 |
| 9,614,845 B2 | 4/2017 | Rolfe | |
| 9,619,641 B2 | 4/2017 | Terashita | |
| 9,660,974 B2* | 5/2017 | Grajek | H04L 67/125 |
| 9,813,400 B2 | 11/2017 | Ross | |
| 9,825,954 B2 | 11/2017 | Zou et al. | |
| 9,864,999 B2 | 1/2018 | Cheng et al. | |
| 10,320,803 B2 | 6/2019 | Gratton | |
| 10,742,640 B2 | 8/2020 | Fang | |
| 2005/0091359 A1 | 4/2005 | Soin et al. | |
| 2005/0091539 A1* | 4/2005 | Wang | G06F 21/31 726/4 |
| 2006/0185004 A1 | 8/2006 | Song et al. | |
| 2006/0255079 A1* | 11/2006 | Magermans | B67D 1/0857 222/529 |
| 2008/0120707 A1* | 5/2008 | Ramia | H04L 63/0861 726/5 |
| 2009/0288138 A1* | 11/2009 | Kalofonos | H04L 63/0884 726/2 |
| 2010/0024005 A1* | 1/2010 | Huang | H04L 67/02 726/3 |
| 2010/0274859 A1 | 10/2010 | Bucuk | |
| 2012/0291109 A1 | 11/2012 | Minamizawa | |
| 2014/0040443 A1 | 2/2014 | Syu et al. | |
| 2017/0148009 A1* | 5/2017 | Perez Lafuente | G06Q 20/3821 |
| 2017/0244688 A1 | 8/2017 | Kim | |
| 2018/0124037 A1 | 5/2018 | Fang | |
| 2019/0053306 A1 | 2/2019 | Cho | |

FOREIGN PATENT DOCUMENTS

| | | |
|---|---|---|
| CN | 103281327 | 9/2013 |
| CN | 103905546 | 7/2014 |
| CN | 104158883 | 11/2014 |
| CN | 104486747 | 1/2015 |
| CN | 104580074 | 4/2015 |
| EP | 1841143 | 10/2007 |
| JP | 2001189954 | 7/2001 |
| JP | 2005135412 | 5/2005 |
| JP | 2015069560 | 4/2015 |
| JP | 2015108866 | 6/2015 |
| KR | 20040053722 | 6/2004 |
| WO | WO 2015016646 | 2/2015 |

OTHER PUBLICATIONS

Crosby et al., "BlockChain Technology: Beyond Bitcoin," Sutardja Center for Entrepreneurship & Technology Technical Report, Oct. 16, 2015, 35 pages.

International Search Report by the International Searching Authority issued in International Application No. PCT/CN2016/086869 dated Sep. 14, 2016; 8 pages.

Nakamoto, "Bitcoin: A Peer-to-Peer Electronic Cash System," wwww.bitcoin.org, 2005, 9 pages.

PCT International Preliminary Report on Patentability in International Application No. PCT/CN2016/086869, dated Jan. 2, 2018, 10 pages (with English translation).

Search Report and Written Opinion by the Intellectual Property Office of Singapore issued in Singapore Application No. 11201710600X dated Aug. 15, 2018; 8 pages.

\* cited by examiner

IDENTIFICATION OF A RELATED COMPUTING DEVICE FOR AUTOMATIC ACCOUNT LOGIN

This application is a continuation of and claims the benefit of priority of U.S. patent application Ser. No. 15/857,730, filed Dec. 29, 2017, which is a continuation of PCT Application No. PCT/CN2016/086869, filed on Jun. 23, 2016, which claims priority to Chinese Patent Application No. 201510383179.8, filed on Jul. 2, 2015, and each application is incorporated by reference in their entirety.

TECHNICAL FIELD

This disclosure relates to data security and, more particularly, to automatic user account login.

BACKGROUND

A user often owns more than one computing device, such as smartphone, tablet, or personal computer (PC). To log in to a user account on a particular computing device, the user often needs to provide login information such as a user identification (ID) and password. When the user switches between computing devices, it is often required that the login information be reentered.

SUMMARY

The present disclosure describes methods and apparatus for identifying related computing devices for automatic user account login on multiple devices.

In an implementation, a login request to a user account that includes a unique identification (ID) of the user computing device and an internet protocol (IP) address of the user computing device are received from a user computing device. One or more user computing devices that have logged in to the user account using a same IP address as the user computing device are identified based on a user ID of the user account and the unique ID of the user computing device. Whether one or more unique IDs corresponding to the one or more user computing devices that have logged in to the user account are correlated with the unique ID of the user computing device is determined, and data corresponding to login information used by the one or more user computing devices to log in to the user account to the user computing device for automatic account login are sent if the one or more unique IDs corresponding to the one or more user computing devices that have logged in to the user account are correlated with the unique ID of the user computing device.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, the login process of a user computing device can be simplified without the addition of particular software or hardware components. Second, limitations on cross-terminal login are reduced. Third, the security of user account login information is protected.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes technologies related to identifying related computing devices for automatic account login, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

A user often owns more than one computing device, such as smartphone, tablet, or personal computer (PC). To log in to a user account on a particular computing device, the user often needs to provide login information such as a user identification (ID) and password. When the user switches between computing devices, it is often required that the login information be reentered.

In some implementations, when a logged in user of a first computing device switches to a second computing device, a login UI of the first computing device can display a code (for example, a Quick-Response (QR), bar, or text string) that includes login information for the user account. The user can scan the code by using a mobile software application (APP) (such as, WECHAT) to obtain the login information for logging into the user account on the second computing device automatically.

The present disclosure describes technologies permitting a server to automatically log in a user computing device to a user account based on saved login information from other user computing devices. The server can determine a correlation between a user computing device that requested login to the user account and user computing devices that have previously successfully logged in to the user account. In some implementations, the correlation can be established based on an internet protocol (IP) address, unique IDs of the user computing devices, and the user account ID.

Figure 1:
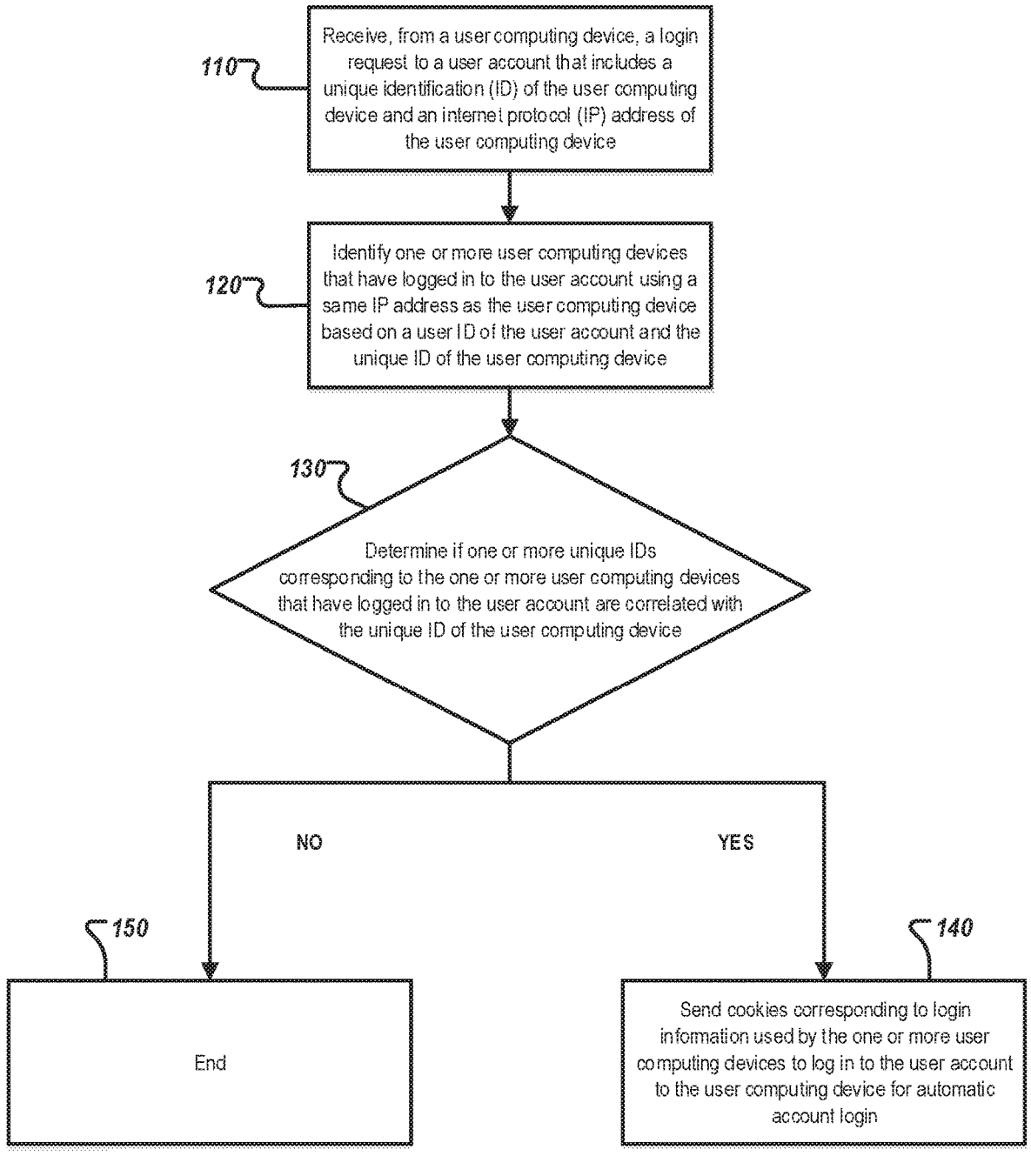
FIG. 1 is a flowchart illustrating an example of a computer-implemented method for automatic user account login, according to an implementation of the present disclosure.

FIG. 1 is a flowchart illustrating an example of a computer-implemented method 100 for automatic user account login, according to an implementation of the present disclosure. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

At 110, a login request to a user account is received from a user computing device. The login request includes at least a unique ID of the user computing device and an IP address of the user computing device. In some implementations, the unique ID can be an ID that can uniquely identify the user computing device such as a Media Access Control (MAC) address of a personal computer (PC), an International Mobile Equipment Identification Number (IMEI) or an International Mobile Subscriber Identification Number (IMSI) of a mobile phone. In some implementations, the unique ID can also be a piece of hardware included within the user computing device that can uniquely identify the user computing device. In some implementations, the IP address of the user computing device can be obtained with a plug-in associated with the login page (for example, a FLASH tool plug-in called with JAVASCRIPT). From 110, method 100 proceeds to 120.

At 120, one or more user computing devices that have logged in to the user account using a same IP address as the user computing device are identified based on a user ID of the user account and the unique ID of the user computing device. In some implementations, a user computing device can send a login request including an IP address for a server to communicate with the user computing device. For example, a user computing device can communicate with a server using Dynamic Host Configuration Protocol (DHCP). The DHCP can automatically provide a user computing device with an IP address and a subnet mask. Based on the user computing device's unique ID and the received IP address included in the login request, the server can identify whether there are one or more user computing devices that have successfully logged in to the requested user account under the same IP address. If one or more user computing devices that have successfully logged in to the requested user account in the past are identified under the same IP address, the one or more user computing devices are considered to be under the same local area network (LAN) as the user computing device and likely owned by the same user. Accordingly, the user computing device that requested the user account login is more likely to be trusted as generating a legitimate request from an authorized user, and can be trusted with the user account login information. When a user computing device is logged in to the user account, the server can store the login information including a user account ID, a unique ID of the logged in user computing device, and an IP address used for the login. From 120, method 100 proceeds to 130.

At 130, it is determined if one or more unique IDs corresponding to the one or more user computing devices that have logged in to the user account are correlated with the unique ID of the user computing device. If yes, method 100 proceeds to 140, otherwise, method 100 ends at 150.

In some implementations, a correlation is established between a unique ID of the user computing device that sends the login request and a unique ID of a user computing device that has logged in to the user account. The established correlation can indicate that the user computing device that sends the login request and the user computing device that has logged in are under the same authorization, owned by the same owner, or otherwise related in some way to each other. Therefore, it is considered to be safe to use the login information used by the logged in user computing device and saved on the server to automatically log in the user computing device that sends the login request. If a correlation is not established, it can indicate that the user computing device is owned by a different user in a same local area network under the same IP address, or the user computing devices are not related in some way to each other.

In some implementations, to establish a correlation after a user computing device has logged in to a user account served by a server, the server can generate a code (for example, a Quick-Response (QR), bar, or text string) based on a unique ID of the user computing device and send the code to one or more other user computing devices served by the server. As such, a correlation is established between the one or more other user computing devices that receive the code and the user computing device whose unique ID the code is based on. In some implementations, the user computing device can generate a code based on its unique ID and send the code to other user computing devices to establish a correlation with the other user computing devices.

In some implementations, correlation between user computing devices can be established through BLUETOOTH or near field communication (NFC). For example, a user computing device can obtain unique ID of another user computing device connected to it through BLUETOOTH or NFC, correlating its unique ID with the obtained unique ID, and sending the correlation to a server. In some implementations, the user computing device can also send its own unique ID to another user computing device. The other user computing device can correlate its unique ID with the received unique ID and send the correlation to the server.

At 140, data (for example, cookies) corresponding to login information used by the one or more user computing devices to log in to the user account are sent to the user computing device for automatic account login. After 140, method 100 ends.

Figure 2:
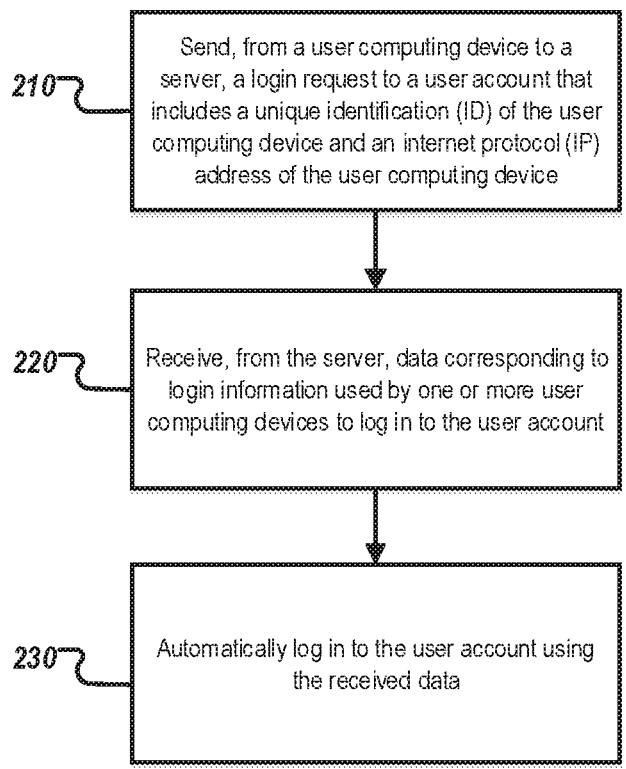
FIG. 2 is a flowchart illustrating another example of a computer-implemented method for automatic user account login, according to an implementation of the present disclosure.

FIG. 2 is a flowchart illustrating another example of a computer-implemented method 200 for automatic user account login, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order.

At 210, send, from a user computing device to a server, a login request to a user account that includes a unique ID and an IP address of the user computing device. In some implementations, a login page can be opened in a browser on the user computing device and the user computing device can automatically send a login request that includes the unique ID and the IP address of the user computing device. The unique ID and the IP address can be used by the server to automatically log in the user computing device to the user account based on the login information obtained from user computing devices that have logged in to the user account. In some implementations, the IP address of the user computing device can be obtained with a plug-in associated with the login page (for example, a FLASH tool plug-in called with JAVASCRIPT). From 210, method 200 proceeds to 220.

At 220, data (for example, cookies) corresponding to login information used by one or more other user computing devices to log in to the user account are received by the user computing device. Each of the one or more other user computing devices has a unique ID correlated to the unique ID of the user computing device. Based on the user computing device's unique ID and the received IP address included in the login request, a server can identify whether there are one or more user computing devices that have already successfully logged in to the requested user account under the same IP address. If one or more user computing devices that have already successfully logged in to the requested user account are identified under the same IP address, the one or more user computing devices are under the same LAN as the user computing device. Therefore, the one or more user computing devices are likely owned by the same user. The user computing device that requested the user account login is more likely to be trusted as a legitimate request from an authorized user, hence can be trusted with the user account login information. When a user computing device is logged in to the user account, the server can store the login information including a user account ID, a unique ID of the logged in user computing device, and an IP address used for the login.

If the server determines that at least one of the one or more user computing devices that have logged in to the user account in the past has a unique ID correlated to the unique ID of the user computing device, it can send data corresponding to login information used by the one or more user computing devices to log in to the user account to the user computing device for automatic account login. From 220, method 200 proceeds to 230.

At 230, the user account is automatically logged in using the received data. After 230, method 200 ends.

Figure 3:
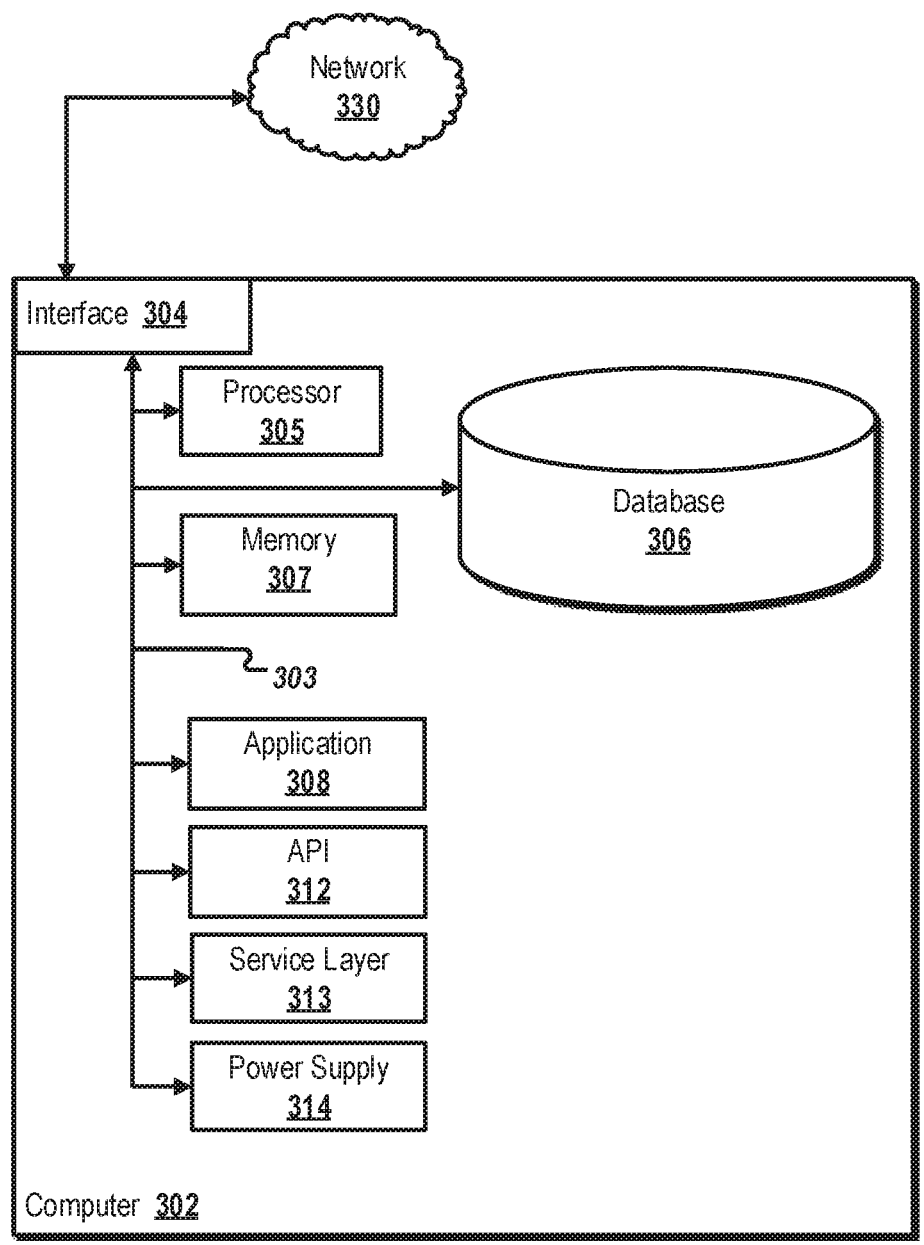
FIG. 3 is a block diagram illustrating an example of a computer-implemented system used to provide computational functionalities associated with described algorithms, methods, functions, processes, flows, and procedures, according to an implementation of the present disclosure.

FIG. 3 is a block diagram illustrating an example of a computer-implemented System 300 used to provide computational functionalities associated with described algorithms, methods, functions, processes, flows, and procedures, according to an implementation of the present disclosure. In the illustrated implementation, System 300 includes a Computer 302 and a Network 330.

The illustrated Computer 302 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 302 can include an input device, such as a keypad, keyboard, touch screen, another input device, or a combination of input devices that can accept user information, and an output device that conveys information associated with the operation of the Computer 302, including digital data, visual, audio, another type of information, or a combination of types of information, on a graphical-type user interface (UI) (or GUI) or other UI.

The Computer 302 can serve in a role in a distributed computing system as a client, network component, a server, a database or another persistency, another role, or a combination of roles for performing the subject matter described in the present disclosure. The illustrated Computer 302 is communicably coupled with a Network 330. In some implementations, one or more components of the Computer 302 can be configured to operate within an environment, including cloud-computing-based, local, global, another environment, or a combination of environments.

At a high level, the Computer 302 is an electronic computing device operable to receive, transmit, process, store, or manage data and information associated with the described subject matter. According to some implementations, the Computer 302 can also include or be communicably coupled with a server, including an application server, e-mail server, web server, caching server, streaming data server, another server, or a combination of servers.

The Computer 302 can receive requests over Network 330 (for example, from a client software application executing on another Computer 302) and respond to the received requests by processing the received requests using a software application or a combination of software applications. In addition, requests can also be sent to the Computer 302 from internal users (for example, from a command console or by another internal access method), external or third-parties, or other entities, individuals, systems, or computers.

Each of the components of the Computer 302 can communicate using a System Bus 303. In some implementations, any or all of the components of the Computer 302, including hardware, software, or a combination of hardware and software, can interface over the System Bus 303 using an application programming interface (API) 312, a Service Layer 313, or a combination of the API 312 and Service Layer 313. The API 312 can include specifications for routines, data structures, and object classes. The API 312 can be either computer-language independent or dependent and refer to a complete interface, a single function, or even a set of APIs. The Service Layer 313 provides software services to the Computer 302 or other components (whether illustrated or not) that are communicably coupled to the Computer 302. The functionality of the Computer 302 can be accessible for all service consumers using the Service Layer 313. Software services, such as those provided by the Service Layer 313, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 302, alternative implementations can illustrate the API 312 or the Service Layer 313 as stand-alone components in relation to other components of the Computer 302 or other components (whether illustrated or not) that are communicably coupled to the Computer 302. Moreover, any or all parts of the API 312 or the Service Layer 313 can be implemented as a child or a sub-module of another software module, enterprise application, or hardware module without departing from the scope of the present disclosure.

The Computer 302 includes an Interface 304. Although illustrated as a single Interface 304, two or more Interfaces 304 can be used according to particular needs, desires, or particular implementations of the Computer 302. The Interface 304 is used by the Computer 302 for communicating with another computing system (whether illustrated or not) that is communicatively linked to the Network 330 in a distributed environment. Generally, the Interface 304 is operable to communicate with the Network 330 and includes logic encoded in software, hardware, or a combination of software and hardware. More specifically, the Interface 304 can include software supporting one or more communication protocols associated with communications such that the Network 330 or hardware of Interface 304 is operable to communicate physical signals within and outside of the illustrated Computer 302.

The Computer 302 includes a Processor 305. Although illustrated as a single Processor 305, two or more Processors 305 can be used according to particular needs, desires, or particular implementations of the Computer 302. Generally, the Processor 305 executes instructions and manipulates data to perform the operations of the Computer 302 and any algorithms, methods, functions, processes, flows, and procedures as described in the present disclosure.

The Computer 302 also includes a Database 306 that can hold data for the Computer 302, another component communicatively linked to the Network 330 (whether illustrated or not), or a combination of the Computer 302 and another component. For example, Database 306 can be an in-memory, conventional, or another type of database storing data consistent with the present disclosure. In some implementations, Database 306 can be a combination of two or more different database types (for example, a hybrid in-memory and conventional database) according to particular needs, desires, or particular implementations of the Computer 302 and the described functionality. Although illustrated as a single Database 306, two or more databases of similar or differing types can be used according to particular needs, desires, or particular implementations of the Computer 302 and the described functionality. While Database 306 is illustrated as an integral component of the Computer 302, in alternative implementations, Database 306 can be external to the Computer 302.

The Computer 302 also includes a Memory 307 that can hold data for the Computer 302, another component or components communicatively linked to the Network 330 (whether illustrated or not), or a combination of the Computer 302 and another component. Memory 307 can store any data consistent with the present disclosure. In some implementations, Memory 307 can be a combination of two or more different types of memory (for example, a combination of semiconductor and magnetic storage) according to particular needs, desires, or particular implementations of the Computer 302 and the described functionality. Although illustrated as a single Memory 307, two or more Memories 307 or similar or differing types can be used according to particular needs, desires, or particular implementations of the Computer 302 and the described functionality. While Memory 307 is illustrated as an integral component of the Computer 302, in alternative implementations, Memory 307 can be external to the Computer 302.

The Application 308 is an algorithmic software engine providing functionality according to particular needs, desires, or particular implementations of the Computer 302, particularly with respect to functionality described in the present disclosure. For example, Application 308 can serve as one or more components, modules, or applications. Further, although illustrated as a single Application 308, the Application 308 can be implemented as multiple Applications 308 on the Computer 302. In addition, although illustrated as integral to the Computer 302, in alternative implementations, the Application 308 can be external to the Computer 302.

The Computer 302 can also include a Power Supply 314. The Power Supply 314 can include a rechargeable or non-rechargeable battery that can be configured to be either user- or non-user-replaceable. In some implementations, the Power Supply 314 can include power-conversion or management circuits (including recharging, standby, or another power management functionality). In some implementations, the Power Supply 314 can include a power plug to allow the Computer 302 to be plugged into a wall socket or another power source to, for example, power the Computer 302 or recharge a rechargeable battery.

There can be any number of Computers 302 associated with, or external to, a computer system containing Computer 302, each Computer 302 communicating over Network 330. Further, the term "client," "user," or other appropriate terminology can be used interchangeably, as appropriate, without departing from the scope of the present disclosure. Moreover, the present disclosure contemplates that many users can use one Computer 302, or that one user can use multiple computers 302.

Described implementations of the subject matter can include one or more features, alone or in combination.

For example, in a first implementation, a computer-implemented method, comprising: receiving, from a user computing device, a login request to a user account that includes a unique ID of the user computing device and an IP address of the user computing device; identifying one or more user computing devices that have logged in to the user account using a same IP address as the user computing device based on a user ID of the user account and the unique ID of the user computing device; determining if one or more unique IDs corresponding to the one or more user computing devices that have logged in to the user account are correlated with the unique ID of the user computing device; and sending data corresponding to login information used by the one or more user computing devices to log in to the user account to the user computing device for automatic account login if the one or more unique IDs corresponding to the one or more user computing devices that have logged in to the user account are correlated with the unique ID of the user computing device.

The foregoing and other described implementations can each, optionally, include one or more of the following features:

A first feature, combinable with any of the following features, wherein the login request to the user account is sent in response to the user computing device accessing a login page, and wherein the IP address of the user computing device is obtained by calling a FLASH tool plug-in of the login page with JAVASCRIPT.

A second feature, combinable with any of the previous or following features, wherein the data includes at least a user ID and password of the user account obtained from one or more internet browsers of the one or more user computing devices.

A third feature, combinable with any of the previous or following features, generating at least one code based on at least one of the one or more unique IDs; sending the at least one code to the user computing device; and wherein the one or more unique IDs corresponding to the one or more user computing devices that have logged in to the user account are correlated with the unique ID of the user computing device if the user computing device recognizes the at least one code.

A fourth feature, combinable with any of the previous or following features, wherein the one or more unique IDs corresponding to the one or more user computing devices that have logged in to the user account are correlated with the unique ID of the user computing device if the user computing device is connected to the one or more user computing devices through Bluetooth or near field communications.

A fifth feature, combinable with any of the previous or following features, wherein the code is a QR code, a bar code, or a text string.

A sixth feature, combinable with any of the previous or following features, wherein the data corresponding to login information used by the one or more user computing devices is sent in data cookies.

In a second implementation, a non-transitory, computer-readable medium storing one or more instructions executable by a computer system to perform operations comprising: receiving, from a user computing device, a login request to a user account that includes a unique ID of the user computing device and an IP address of the user computing device; identifying one or more user computing devices that have logged in to the user account using a same IP address as the user computing device based on a user ID of the user account and the unique ID of the user computing device; determining if one or more unique IDs corresponding to the one or more user computing devices that have logged in to the user account are correlated with the unique ID of the user computing device; and sending data corresponding to login information used by the one or more user computing devices to log in to the user account to the user computing device for automatic account login if the one or more unique IDs corresponding to the one or more user computing devices that have logged in to the user account are correlated with the unique ID of the user computing device.

The foregoing and other described implementations can each, optionally, include one or more of the following features:

A first feature, combinable with any of the following features, wherein the login request to the user account is sent in response to the user computing device accessing a login page, and wherein the IP address of the user computing device is obtained by calling a FLASH tool plug-in of the login page with JAVASCRIPT.

A second feature, combinable with any of the previous or following features, wherein the data includes at least a user ID and password of the user account obtained from one or more internet browsers of the one or more user computing devices.

A third feature, combinable with any of the previous or following features, generating at least one code based on at least one of the one or more unique IDs; sending the at least one code to the user computing device; and wherein the one or more unique IDs corresponding to the one or more user computing devices that have logged in to the user account are correlated with the unique ID of the user computing device if the user computing device recognizes the at least one code.

A fourth feature, combinable with any of the previous or following features, wherein the one or more unique IDs corresponding to the one or more user computing devices that have logged in to the user account are correlated with the unique ID of the user computing device if the user computing device is connected to the one or more user computing devices through Bluetooth or near field communications.

A fifth feature, combinable with any of the previous or following features, wherein the code is a QR code, a bar code, or a text string.

A sixth feature, combinable with any of the previous or following features, wherein the data corresponding to login information used by the one or more user computing devices is sent in data cookies.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving, from a user computing device, a login request to a user account that includes a unique ID of the user computing device and an IP address of the user computing device; identifying one or more user computing devices that have logged in to the user account using a same IP address as the user computing device based on a user ID of the user account and the unique ID of the user computing device; determining if one or more unique IDs corresponding to the one or more user computing devices that have logged in to the user account are correlated with the unique ID of the user computing device; and sending data corresponding to login information used by the one or more user computing devices to log in to the user account to the user computing device for automatic account login if the one or more unique IDs corresponding to the one or more user computing devices that have logged in to the user account are correlated with the unique ID of the user computing device.

The foregoing and other described implementations can each, optionally, include one or more of the following features:

A first feature, combinable with any of the following features, wherein the login request to the user account is sent in response to the user computing device accessing a login page, and wherein the IP address of the user computing device is obtained by calling a FLASH tool plug-in of the login page with JAVASCRIPT.

A second feature, combinable with any of the previous or following features, wherein the data includes at least a user ID and password of the user account obtained from one or more internet browsers of the one or more user computing devices.

A third feature, combinable with any of the previous or following features, generating at least one code based on at least one of the one or more unique IDs; sending the at least one code to the user computing device; and wherein the one or more unique IDs corresponding to the one or more user computing devices that have logged in to the user account are correlated with the unique ID of the user computing device if the user computing device recognizes the at least one code.

A fourth feature, combinable with any of the previous or following features, wherein the one or more unique IDs corresponding to the one or more user computing devices that have logged in to the user account are correlated with the unique ID of the user computing device if the user computing device is connected to the one or more user computing devices through Bluetooth or near field communications.

A fifth feature, combinable with any of the previous or following features, wherein the code is a QR code, a bar code, or a text string.

A sixth feature, combinable with any of the previous or following features, wherein the data corresponding to login information used by the one or more user computing devices is sent in data cookies.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatus, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some implementations, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   sending, from a user computing device to a server, a login request for a user account that includes a unique identifier (ID) of the user computing device and a network address of the user computing device;
   receiving, by the user computing device from the server, data corresponding to login information used by one or more user computing devices to log in to the user account, wherein the received data represents that one or more unique IDs of the one or more user computing devices that have logged in to the user account have a correlated relationship with the unique ID of the user computing device, wherein the correlated relationship between the one or more unique IDs of the one or more user computing devices and the unique ID of the user computing device are obtained by performing operations comprising:
   generating, by the user computing device, a code using the unique ID of the user computing device;
   sending, from the user computing device, the code to the one or more user computing devices; and
   sending, from the user computing device, the correlated relationship between the one or more unique IDs of the one or more user computing devices and the unique ID of the user computing device to the server; and
   performing, by the user computing device, automatic account login to the user account by processing the received data.

2. The computer-implemented method of claim 1, wherein the correlated relationship between the one or more unique IDs of the one or more user computing devices and the unique ID of the user computing device are obtained by performing the operations further comprising:
   connecting, between the user computing device and the one or more user computing devices through Bluetooth or near field communications;
   obtaining, by the user computing device, the one or more unique IDs of the one or more user computing devices; and
   sending, by the user computing device, the correlated relationship between the obtained one or more unique IDs of the one or more user computing devices and the unique ID of the user computing device to the server.

3. The computer-implemented method of claim 1, wherein the login request to the user account is sent in response to the user computing device accessing a login page, and wherein the network address of the user computing device is obtained by calling a FLASH tool plug-in of the login page with JAVASCRIPT.

4. The computer-implemented method of claim 1, wherein the received data includes at least a user ID and password of the user account obtained from one or more internet browsers of the one or more user computing devices.

5. The computer-implemented method of claim 1, wherein the code is a QR code, a bar code, or a text string.

6. The computer-implemented method of claim 1, wherein the received data corresponding to the login information used by the one or more user computing devices is sent in data cookies.

7. A non-transitory, computer-readable medium storing one or more instructions executable by a computer system to perform one or more operations comprising:
   sending, from a user computing device to a server, a login request for a user account that includes a unique identifier (ID) of the user computing device and a network address of the user computing device;
   receiving, by the user computing device from the server, data corresponding to login information used by one or more user computing devices to log in to the user account, wherein the received data represents that one or more unique IDs of the one or more user computing devices that have logged in to the user account have a correlated relationship with the unique ID of the user computing device, wherein the correlated relationship between the one or more unique IDs of the one or more user computing devices and the unique ID of the user computing device are obtained by performing operations comprising:
   generating, by the user computing device, a code using the unique ID of the user computing device;
   sending, from the user computing device, the code to the one or more user computing devices; and
   sending, from the user computing device, the correlated relationship between the one or more unique IDs of the one or more user computing devices and the unique ID of the user computing device to the server; and
   performing, by the user computing device, automatic account login to the user account by processing the received data.

8. The non-transitory, computer-readable medium of claim 7, wherein the correlated relationship between the one or more unique IDs of the one or more user computing devices and the unique ID of the user computing device are obtained by performing the operations further comprising:
   connecting, between the user computing device and the one or more user computing devices through Bluetooth or near field communications;
   obtaining, by the user computing device, the one or more unique IDs of the one or more user computing devices; and
   sending, by the user computing device, the correlated relationship between the obtained one or more unique IDs of the one or more user computing devices and the unique ID of the user computing device to the server.

9. The non-transitory, computer-readable medium of claim 7, wherein the login request to the user account is sent in response to the user computing device accessing a login page, and wherein the network address of the user computing device is obtained by calling a FLASH tool plug-in of the login page with JAVASCRIPT.

10. The non-transitory, computer-readable medium of claim 7, wherein the received data includes at least a user ID and password of the user account obtained from one or more internet browsers of the one or more user computing devices.

11. The non-transitory, computer-readable medium of claim 7, wherein the code is a QR code, a bar code, or a text string.

12. The non-transitory, computer-readable medium of claim 7, wherein the received data corresponding to the login information used by the one or more user computing devices is sent in data cookies.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
sending, from a user computing device to a server, a login request for a user account that includes a unique identifier (ID) of the user computing device and a network address of the user computing device;
receiving, by the user computing device from the server, data corresponding to login information used by one or more user computing devices to log in to the user account, wherein the received data represents that one or more unique IDs of the one or more user computing devices that have logged in to the user account have a correlated relationship with the unique ID of the user computing device, wherein the correlated relationship between the one or more unique IDs of the one or more user computing devices and the unique ID of the user computing device are obtained by performing operations comprising:
generating, by the user computing device, a code using the unique ID of the user computing device;
sending, from the user computing device, the code to the one or more user computing devices; and
sending, from the user computing device, the correlated relationship between the one or more unique IDs of the one or more user computing devices and the unique ID of the user computing device to the server; and
performing, by the user computing device, automatic account login to the user account by processing the received data.

14. The computer-implemented system of claim 13, wherein the correlated relationship between the one or more unique IDs of the one or more user computing devices and the unique ID of the user computing device are obtained by performing the operations further comprising:
connecting, between the user computing device and the one or more user computing devices through Bluetooth or near field communications;
obtaining, by the user computing device, the one or more unique IDs of the one or more user computing devices; and
sending, by the user computing device, the correlated relationship between the obtained one or more unique IDs of the one or more user computing devices and the unique ID of the user computing device to the server.

15. The computer-implemented system of claim 13, wherein the login request to the user account is sent in response to the user computing device accessing a login page, and wherein the network address of the user computing device is obtained by calling a FLASH tool plug-in of the login page with JAVASCRIPT.

16. The computer-implemented system of claim 13, wherein the received data includes at least a user ID and password of the user account obtained from one or more internet browsers of the one or more user computing devices.

17. The computer-implemented system of claim 13, wherein the received data corresponding to the login information used by the one or more user computing devices is sent in data cookies.

18. The computer-implemented system of claim 13, wherein the code is a QR code, a bar code, or a text string.

* * * * *